United States Patent [19]

Laney et al.

[11] Patent Number: 5,244,726
[45] Date of Patent: Sep. 14, 1993

[54] ADVANCED GEOPOLYMER COMPOSITES

[75] Inventors: Bill E. Laney; F. Truman Williams; Ronald L. Rutherford; David T. Bailey, all of Albuquerque, N. Mex.

[73] Assignee: The HERA Corporation, Albuquerque, N. Mex.

[21] Appl. No.: 939,548

[22] Filed: Aug. 31, 1992

Related U.S. Application Data

[63] Continuation of Ser. No. 159,345, Feb. 23, 1988, abandoned.

[51] Int. Cl.$^5$ ............... C04B 12/04; C04B 18/08; C04B 20/00; C04B 32/00
[52] U.S. Cl. ............... 428/312.6; 106/601; 106/602; 106/605; 106/610; 106/632; 428/312.4; 428/703
[58] Field of Search ............... 106/601, 602, 605; 428/312.4, 312.6

[56] References Cited

U.S. PATENT DOCUMENTS

| | | | |
|---|---|---|---|
| 1,944,008 | 1/1934 | Hobart | 106/601 |
| 2,170,102 | 8/1939 | Thompson et al. | 106/601 |
| 2,481,390 | 9/1949 | Campbell | 106/605 |
| 2,921,357 | 1/1960 | Fujii et al. | 106/601 |
| 3,203,813 | 8/1965 | Gyardo et al. | 106/602 |
| 3,466,221 | 9/1969 | Sams et al. | 106/601 |
| 3,508,936 | 4/1970 | Lyass et al. | 106/610 |
| 3,741,898 | 6/1973 | Mallow et al. | 106/601 |
| 3,856,539 | 12/1974 | Mallow et al. | 106/601 |
| 3,951,834 | 4/1976 | Gillilan | 106/601 |
| 4,230,765 | 10/1980 | Takahashi et al. | 428/283 |
| 4,263,048 | 4/1981 | Hacker | 428/453 |
| 4,647,499 | 3/1987 | Takahashi et al. | 428/312.6 |

Primary Examiner—James C. Cannon
Attorney, Agent, or Firm—Samuel M. Freund

[57] ABSTRACT

A self-hardened, high temperature-resistant, foamed composite is described. An alkali metal silicate-based matrix devoid of chemical water has dispersed therein inorganic particulates, organic particulates, or a mixture of inorganic and organic particulates, and is produced at ambient temperature by activating the silicates of an aqueous, air-entrained gel containing matrix-forming silicate, particulates, flyash, surfactant, and a pH-lowering and buffering agent.

16 Claims, 1 Drawing Sheet

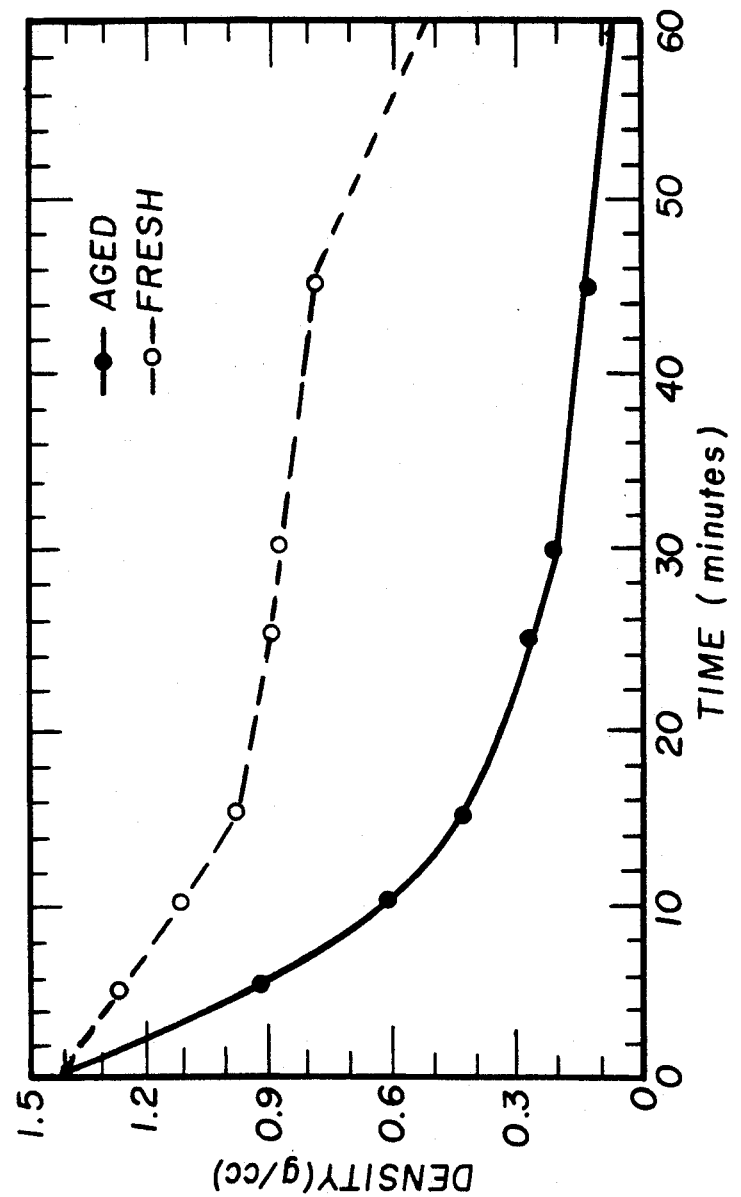
FIGURE

ADVANCED GEOPOLYMER COMPOSITES

This is a continuation of copending application Ser. No. 159,345 filed on Feb. 23, 1988, now abandoned.

BACKGROUND OF THE INVENTION

This invention relates to a broad class of high temperature composite materials that consist, essentially, of two distinct phases—a ceramic-like matrix which can be one of many different silicate-based geopolymers and a homogeneous dispersion of organic/inorganic additives of various shapes and dimensions. Individually, these two phases are generally unsuitable for high temperature applications, however, they combine in the composite form to produce a wide spectrum of refractory materials. More particularly, this invention relates to ambient cured, controlled density, advanced geopolymer composites whose macroscopic physical properties can be tailored for specific applications, over significant temperature ranges, by judicious specifications of dispersed phase components and selective chemical modifications to pre-gelled geopolymer resins. The invention also relates to process-dependent methods for fabricating such advanced geopolymer composites.

Particulate additives or "fillers" are sometimes added to high temperature materials to impart certain characteristics such as strength, flexibility or insulation. These fillers often include mineral glasses or fibrous reinforcers. Many naturally occurring mineral glasses, i.e., amorphous silica, contain sufficient chemically bound water to facilitate steam production upon melting. This causes the glass to expand into a very low density cellular aggregate, in a sense, an inorganic foamed material. Perlite is a popular volcanic glass which expands to very low density particles and is often used in the expanded form as a composite additive/filler in conjunction with sodium silicate binders, gypsum plasters, and Portland cements. These inorganic composites form low density, low thermal conductivity, insulating materials.

Fiber reinforcement of Portland cements, gypsum plasters, and sodium silicate binders is one method of enhancing the strength of inorganic materials. Fiberglass, mineral wool, and certain new ceramic refractory fibers have also been employed; however, the strong alkaline nature of these cements often produces considerable damage to the fibers. Alkaline resistant fiberglass has been developed and marked; however, many of these fibers are not easily bonded with inorganic cements. Water soluble foaming agents have also been added to various inorganic materials to enhance air entrainment and further reduce density.

Over the past several decades, industry has shown a preference for low cost petrochemical and thermoplastic hydrocarbon substitutes over inorganic materials. Typical examples include: foam plastic insulation substitutes for fiberglass and mineral wool; latex/acrylic modified cements and stuccoes; and synthetic substitutes for gypsum products. Some of these substitutions produce very desirable properties and advantages, however, in most cases, the substituted products increase fire and smoke hazards due to the combustibility of substituted ingredients.

In general, although organic materials have certain advantageous features which commend themselves to specific applications, these uses are usually attended by increased fire risk and smoke production when compared to their traditional inorganic counterparts. Therefore, it would be desirable to provide a class of material composites which incorporates significant proportions of both organics and inorganics. It would further be desirable to limit the combustibility of these composites to a level generally associated with inorganics while taking advantage of the desired physical properties of the organic constituents. In this manner, product designers can benefit from the advantages of organic fibers, foam fillers, etc., while enjoying the assurance of limited combustibility, non-toxicity, and energy conservation.

SUMMARY OF THE INVENTION

This invention is drawn to a class of advanced geopolymer composition, useful for a myriad of commercial applications, and methods for making the composites. In a broad aspect, advanced geopolymer composites include both organic and inorganic dispersed phases within a high temperature geopolymer matrix material.

In a more specific aspect, the invention is drawn to geopolymer resins which set and cure at ambient temperature and pressure to form a stable composite material whose process-dependent macroscopic physical properties may include selected features of the geopolymer matrix material as well as the particles, i.e., fibers, fillers, and extenders.

During mixing or other formulation stages, advanced geopolymer composites may comprise a foamable liquid geopolymer resin, an activator, and active filler particle ingredients. Upon activation and curing, the ingredients combine to form a high temperature geopolymer matrix material having filler particles interspersed therein. Depending on specified high temperature performance requirements, the preferred filler particles may include a wide variety of organic or inorganic materials in various shapes and sizes.

Upon curing, the geopolymer resin hardens to encase the filler particles. Thus, even when an interior organic filler material melts or decomposes due to intense heat conduction from external high temperature surfaces, the geopolymer matrix material retains its structural qualities.

In a preferred embodiment of the invention, a substantial volume proportion of organic or inorganic particles, e.g., at least about 30–40 percent, is added to a geopolymer resin which is foamed by air entrainment to achieve any desired density. The additive particles are mixed with the geopolymer resin in a manner that provides substantial or at least effective wetting of the particles. An activator is then added to initiate a gel, set, and cure cycle, and process water is released during the curing cycle. The geopolymer matrix material typically hardens in the absence of externally applied heat or pressure, e.g., under ambient conditions.

In an especially preferred embodiment of the invention, the geopolymer resin includes kaloin, flyash, or wollastonite suspended in an aqueous solutions of sodium silicate, magnesium chloride, and an anion surfactant. The activator preferably comprises a dry powder formulation of a pH-lowering, slowly dissolving buffer, such as sodium silicofluoride and a high density, slowly dissolving, long term strengthening agent such as the wollastonite form of calcium metasilicate.

BRIEF DESCRIPTION OF THE DRAWINGS

The accompanying drawing, which is incorporated in and forms a part of the specification, illustrates an embodiment of the present invention and, together with the description, serves to explain the principles of the invention. The FIGURE illustrates aged and fresh-mixed foamed geopolymer adhesive product densitites as a function of mixing time.

DETAILED DESCRIPTION OF THE INVENTION AND A PREFERRED EMBODIMENT

In a general aspect, the invention is directed to a composition comprising a foamable geopolymer resin, activator, and a particulate additive. Broadly, the foamable geopolymer resin may include a major portion of a soluble alkali metal silicate, preferably sodium silicate. It also may include: effective amounts of an alkali earth metal chloride, such as calcium chloride or magnesium chloride; a variety of inorganic thickeners; and a surfactant that is capable of wetting plastics and other organics, preferably an anionic surfactant.

The foamable geopolymer resin is of a type that, upon the addition of an activator which comprises a pH lowering buffer agent and may include a strengthening agent, converts to a self-hardening geopolymer matrix material. Before the reacting geopolymer resin reaches the gel stage, it may be air-entrained to the desired density, i.e., foamed and intermixed with an effective amount of organic or inorganic particulate filler, or "filler particles".

The geopolymer resin material is an essential part of the invention, and it must be present in sufficient amounts to coat and support the filler particles. This is particularly true when organic filler particles are used in the fabrication of advanced geopolymer composites. Without being limited by theory, it is believed that the geopolymer matrix material surrounds the filler particles and, even when internal organic particles melt or decompose due to intense heat conduction from external high temperature surfaces, the geopolymer matrix material retains its structural integrity and other performance qualities. Accordingly, even when the advanced geopolymer composite includes such flammable organic particles as expanded polystyrene (EPS) beads, overall fire resistance is improved. In this manner, the inorganic geopolymer matrix material, when bonded to organic fiber particles in accordance with the present invention, prevents excessive surface burning, flame spread, and smoke generation while maintaining adequate dimensional stability.

An especially preferred ingredient of the geopolymer resin material is a water-soluble alkali metal silicate. Sodium, potassium, and lithium silicates have been prepared commercially, and any one of these may be employed in solid, hydrated, or anhydrous forms.

A specific preferred embodiment of the present invention comprises a commercially available soluble sodium silicate. In that embodiment, although water is added during the formulation of the geopolymer resin, the final cured matrix material will have lost all available process water. Commercially available solutions of sodium silicate have a density of approximately 41° Baume (1.4 gram/cc), and the silica:alkali weight ratio for such a material is about 3.22. From an economic standpoint, the higher silica ratios are preferred. Any ratio throughout the available range of 1.6 to 4.5 may be used, however, modest accommodations in gelation time, buffering, etc, must be made for the more alkaline silicates.

The ingredients of geopolymer resin materials are therefore primarily inorganic. Minor amounts of organic surfactant present in the foamable geopolymer resin wet the filler particles prior to gelation.

Another important ingredient of the geopolymer resin is the thickener or thickening agent. Thickeners as used herein are so-called "nucleation site" materials. In accordance with the present invention, three types of materials have been identified as thickeners, each of which imparts slightly different properties to the final, cured, geopolymer matrix material. A preferred embodiment of the invention comprises one type of thickener from the hydrous aluminum silicate clay mineral group commonly referred to as kaolin, china clay, or porcelain clay. The lamella plates of the kaolin with their associated edge electrical charge are exemplary as nucleation sites for silicate growth.

Other aluminum silicate clays, which may be any of the non-intercalating, non-expanding, clays such as halloyaite, illite, and attapulgite may be employed. Water absorbing clays such as bentonite and montmorillonite may also be employed in modest amounts to promote rapid gelation, however, they usually produce geopolymer matrix materials with undesired physical properties.

A third type of thickener which often gives superior results is flyash. The high aluminum oxide and silicon dioxide content of coal-fired power plant flyash in conjunction with its large specific surface area and ability to collect residual electrical charge make this material a good substitute for kaolin. Experimental data indicate that flyash produces a geopolymer matrix material with higher melting point than does the kaolin. An even higher melting geopolymer matrix material can be produced by substituting wollastonite for kaolin; however, the density of the cured geopolymer matrix tends to be greater with wollastonite than matrix materials which employ kaolin or flyash.

The amount of thickener necessary to prevent the geopolymer resin, once foamed, from collapsing is an important aspect of the invention. A specific embodiment of the invention, for example, may comprise as much as 28% by weight of thickener.

In a specific embodiment of the invention which includes kaolinite thickening and wollastonite strengthening agents, respectively, crystallographic investigations indicate the existence of kaolinite lamella uniformly distributed in a matrix bonded by silicate stock. Although the resolution was insufficient to show the distribution of wollastonite (a long-term strengthening agent), wollastonite is generally insoluble in sodium silicate and readily forms fusion bonds to glass. Therefore, it may be inferred that long-term strength is developed in the geopolymer matrix by additional fusion/polymerization of the wollastonite. Some soluble salts may be present in the interstitial pores of the matrix, and, presumably, the surfactant remains at the surface of spherical interstitial foam voids where it is deposited as a result of water evaporation.

The geopolymer resin of this invention differs from other inorganic cements and adhesives in that it sets and cures at ambient temperature and pressure through a complicated series of chemical reactions to form an insoluble geopolymer matrix material which is devoid of chemical water. Any water retention is the result of the matrix porosity and not that of a chemical bond or water of hydration. The reactions are considered irreversible although they proceed with a negligible release of energy, i.e., low exotherm reactions. Advanced geopolymer composites are rigid within an hour of mixing, and, subject to hygroscopicity of the additives and wet density, they cure overnight to within 10% of final density. High density composite materials lose water more slowly, and hygroscopic additives may never release their water content. The reaction does not depend on dry air or elevated temperature for the development of solidity and strength, and gelation and solidification processes continue even when geopolymer resins are submerged in water.

Another important feature of the invention is the surfactant. In accordance with the present invention, the surfactant may be used to promote foaming, however, if a high density geopolymer composite is desired, foaming may not be necessary. Regardless of whether foaming is desired, the surfactant is an essential ingredient which promotes bonding by wetting organic filler particles. The surfactant should be present in amounts designed to provide for interfacial wetting of interfaces between the geopolymer resin and the plastic foam or fiber material, i.e., the "filler particles". A proper surfactant is one which "wets" organics well, and anionic surfactants having hydrophilic and hydrophobic segments are within the scope of this invention provided they promote bonding. A preferred surfactant is sodium lauryl sulfate.

Activation of the geopolymer resin is a necessary step for achieving an advanced geopolymer in accordance with this invention. The activation process should include an activator that is chemically compatible with the geopolymer resin. When the geopolymer resin includes a silicate binder, a preferred activator is a pH-lowering, slowly dissolving, buffer agent such as sodium fluorosilicate. Other additives, e.g., the wollastonite form of calcium-metasilicate, should also be included to control shrinkage and promote long term strength of the geopolymer matrix material.

The filler particles which are added to the geopolymer resin provide different macroscopic physical and thermal properties to the advanced geopolymer composites. Organic particles, for example, generally provide different "effective" thermal and physical properties than inorganic particles.

A specific embodiment of the invention comprises EPS beads, which may be added to the geopolymer resin to provide a low density thermal insulating composite. When the composition is cast into boards or panels of appropriate thicknesses, such a material can serve as its own fire safe thermal barrier. Fire test investigations have shown that, in the presence of intense surface temperatures, although certain amounts of the EPS may slowly burn, vaporize, or melt within the geopolymer matrix of this invention, the remaining material resists the fire exposure in a manner that allows the hardened matrix structure to act as its own fire-thermal barrier. Because there is little or no melting, running, flowing, and subsequent concentration of the EPS in hot molten pools, the material avoids the normal fire hazards associated with large boards and exterior sealed panels.

Another organic particle useful in the invention is polyethylene terephthalate (PET) polyester chopped staple fibers. Because PET has a heat of combustion of about 9,600 btu/lb. it is possible to employ over ⅛ pound of PET per pound of cured geopolymer matrix material and still meet one of the criteria for limited combustibility. The National Fire Protection Association Standard 220 defines combustibility in semi-quantitative terms. For example, a "limited combustible" material has a potential heat of combustion which is less than 3500 btu/lb. of material and demonstrates a flame spread rating of less than 25 when tested in accordance with ASTM E-84 "Surface Burning Characteristics of Building Materials". Smoke generated ratings are not directly specified; however, a rating of less than 25 places the material in the same class as incombustible inorganics, e.g., calcium silicate board. Compositions of the present invention which incorporate PET filler particles in the form of short fibers or laminated blankets have achieved all three criteria for limited combustibility. Although advanced geopolymer composites which employ EPS materials have not been tested in accordance with ASTM E-84; qualitatively, they have been observed to perform in a manner similar to the PET compositions, and, accordingly, they are expected to achieve similar quantitative ratings.

The term "particles" is intended to encompass particles of various dimensions and shapes, including for example, beads, fibers, and blankets. The dimensions of the particles may be relevant for optimizing the strength, thermal conductivity, acoustic absorptivity, etc. of the final advanced geopolymer composite. In addition, particle size can impact dispersion throughout the foamed geopolymer resin, and total surface area of the particles is important in relation to the amount of foamed geopolymer resin material. Generally, sufficient geopolymer resin should be present to bond, support, and provide fire resistance to the particles. Accordingly, different amounts of geopolymer resin may be used, depending on particle size and the desired macroscopic thermophysical properties of the cured matrix material.

In certain aspects of the invention, an important part of the preparation of geopolymer resin is the amount of water added. In some cases, for example, additional water should be added to increase mobilities of other ingredients and reduce viscosities to promote foaming and air entrainment. The addition of too much water, however, may promote either immediate gelation/precipitation of the silicates or dilution to the point of decomposition of the alkali silicate. Accordingly, a specific embodiment of the invention includes a suspension wherein about 15% of the foamable geopolymer resin is added water.

An important ingredient of the geopolymer resin of this invention is an alkaline earth metal chloride, or some other buffer agent, that lowers the pH of the suspension and provides for gelation. Without being limited by theory, the binding mechanism of the soluble silicates during gelation is believed to be heavily influenced by the pH of the geopolymer resin. Accordingly, since relatively minor changes in pH can have a large effect, in accordance with the invention, an effective amount of either magnesium chloride or calcium chloride or a mixture of the two is added to the water to buffer the solution and prevent decomposition. An alkali metal salt such as sodium chloride may promote immediate gelation, and is normally to be avoided.

The range of proportions of the foamed geopolymer resin ingredients, prior to gelation, may be important for achieving the desired properties in the cured matrix material. For final cured densities in the 10-40 pcf range, the following wet weight percentages of foamed geopolymer resin prior to gelation are indicative of the operative ranges: sodium silicate—from 15% to 66%;

wollastonite strengthener—from 6.4% to 58%; sodium silicofluoride activator—from 2.8% to 12.9%; sodium lauryl sulfate surfactant—from 0.12% to 2.0%; magnesium chloride buffer—up to 0.43%; water—up to 15%; and kaolin thickener—up to 28%.

A first mixture may be made by dissolving into water an alkaline earth metal chloride and an anionic surfactant. A sufficient amount of surfactant is added to provide for surface wetting of the filler particles by the geopolymer resin.

A second mixture is made by suspending a thickener such as kaolin, wollastonite, or flyash in a sodium silicate solution. The mixture and suspension are then combined and mixed to form a foamable geopolymer resin. At this point, the geopolymer resin may be air entrained to the desired density prior to the addition of additive filler particles. After all ingredients are properly mixed, i.e., dispersed, the geopolymer resin is activated to initiate gelation and curing which will produce the matrix material. In effect, the procedures for making advanced geopolymer composites include activating the silicates in the geopolymer resin to form a self-hardening composition wherein the geopolymer matrix material encases and supports the filler particles. A preferred activator is sodium silicofluoride.

It has been found that slight modifications to the above procedures produce cured geopolymer matrix materials with considerably higher melting points. For example, substitution of flyash for kaolin in the foamed geopolymer resin produces foamed matrix materials having densities of about 20 pcf and melting points greater than 2050° F.

In a broad aspect, this invention is directed to methods for producing fire resistant composites, however, fire resistance is only one of the numerous significant characteristics of the present invention. A broad spectrum of other macroscopic properties may be obtained, depending generally on the type and amount of added filler materials. For example, fibers may be added for strength or acoustic attenuation properties; carbon or graphite may be added for alteration of dielectric properties; synthetic fabrics may be laminated for structural rigidity, tensile strength, and projectile penetration resistance; and foam plastic beads may be added to lower effective thermal conductivities. In particular, by combining different types of organic/inorganic filler particles, the invention provides a broad avenue for additional synergisms within the area of advanced geopolymer composites.

Although low density advanced geopolymer composites are usually preferred, it is not necessary to achieve low density in every instance. The overall density of the composition is merely a design criterion which may be related to the binder/particle weight ratio. For example, the cured composition of limited combustible materials should have a weight fraction of organics in the cured geopolymer matrix which is less than 3,500 btu's divided by the organic material's heat of combustion in btu/lb.

This invention is defined by the claims. Without limiting the scope of the invention, and in order to promote a clearer understanding of the invention, the following examples describe various process-dependent aspects of the invention.

EXAMPLE 1

Geopolymer Resin Formulations

In this example, geopolymer resin formulations are prepared using a Hobart Model L-800 mixer fitted with an 80 quart mixing bowl and a wire beater paddle. Basic features of this mixer include: a planetary gear drive; and a four position gear shift speed adjustment (Speed 1 through Speed 4). A typical mixing session follows:

In step 1, 7–13 lb. of English kaolin is added to 20–40 lbs. of sodium silicate solution, $SiO_2:Na_2O$ weight ratio of 3.22, and mixed Speed 1 for approximately 1 minute. Once the kaolin is wetted, the mixer speed is increased to Speed 2 for about 3 minutes, and, after 7 minutes of mixing at Speed 3, the initial blending process is complete.

Step 2 begins by dissolving 90–160 grams of flake $MgCl_2 \cdot 6H_2O$ in 7–13 lb. of tap water at ambient temperature. Additionally, 60–100 grams sodium lauryl sulfate, $CH_3(CH_2)_{11}OSO_3Na$, in dry form, is stirred into the solution. Five minutes of dissolution time, with occasional stirring, are adequate to dissolve the magnesium chloride and produce a foam froth.

The surfactant/salt solution from Step 2 is added to the sodium silicate and kaolin suspension of step 1 to form a foamable geopolymer resin. The entrainment of air during mixing creates a froth whose density decreases as a function of time and mixing parameters. After mixing for 45 minutes at Hobart Speed 3, foamed geopolymer resin densities are approximately 0.8 gram/cc.

Foamed geopolymer resins are relatively stable for a period of hours, however, overnight storage may result in some separation of large surface froth bubbles with a remainder of the foamed suspension maintaining a density of about 0.9 gram/cc. It is further noted that, after about 3 days, the foamed geopolymer will collapse to a nominal density of about 1.42 gram/cc. and separation will begin to occur.

EXAMPLE 2

Geopolymer Resin Aging

This example demonstrates the importance of aging geopolymer resins. The FIGURE is a comparison of foamed densities for freshly prepared and aged geopolymer adhesive product as a function of mixing time. It can be seen that aging promotes a better behaved quantitative foaming relationship with mixing time and speed parameters. The values in the FIGURE were taken with equal quantities of foamable geopolymer resin at the same mixing speeds.

EXAMPLE 3

Geopolymer Resin Mixing Parameters

This example demonstrates the importance of mixing parameters. From routine observations, it is highly desirable to begin agitation of geopolymer resins at speed settings 3 and 4. In addition, although very low density foamed geopolymer resins cannot be produced with the mixer set on Speed 4, optimum low density foamed geopolymer resins can be achieved with a mixer speed of 3. In general, it has been established that beater tip speeds in excess of 1000 feet per minute tend to break up the foam cell structure.

Thus, high shear mixing conditions generally break down the foam bubble cell structure. This means that, following the addition of coarse aggregates, mixing should be carried out in very short time periods at very low mixing speeds. Composites characterized by high surface area fine powder dispersions cannot be completely wetted under low speed mixing and blending restraints; therefore, the fine powder component should be added at the beginning of the foaming period and mixed accordingly.

EXAMPLE 4

Geopolymer Resin Gelation And Ambient Cure

This example describes the activation and gelation of foamable geopolymer resins. Geopolymer resins prepared in accordance with this invention exhibit the following characteristics: an unfoamed density of 1.4 gram/cc.; viscosity at normal ambient temperature of about 100 centipoise; and pH of approximately 11.3.

Sodium silicofluoride activator slowly dissolves in the geopolymer resin and lowers its pH. As the pH reaches a value of about 11.1 to 11.2, the generally electro-negative repulsive field within the geopolymer resin collapses sufficiently to allow gelation of the colloidal silicate suspension. Within 30 to 45 minutes after addition of the activator, geopolymer resin ceases to behave as a liquid. At that point, mature gelation has taken place, and the geopolymer matrix material exhibits a jelly-like or rubbery quality for another 30 to 45 minutes until solidification occurs, as evidenced by process water leaving the material. The reaction proceeds with a negligible exotherm, i.e., no detectable release of heat, and cures by loss of water until bulk densities of about 0.9 gram/cc. are achieved. The overall cycle produces very little shrinkage, and curing to no significant change in weight shows that all original water has left the geopolymer matrix material. Loss of process water is represented in the final geopolymer material as porosity.

EXAMPLE 5

Geopolymer Resin Modifications

This example demonstrates how the geopolymer resins of Example 1 can be chemically modified to produce advanced geopolymer composites with a variety of macroscopic physical properties. For example, when powdered relay steel or ferrite particles are dispersed in geopolymer resins to produce castable, high magnetic permeability, refractory materials, the simple addition of 2% by weight of calcium chromate to the solution of Step 2 inhibits long-term corrosion of the dispersed phase components. Similarly, the electrical conductivity of geopolymer resins can be altered by adding 1%-5% by weight of acetylene black to the suspension of Step 1, and these modified geopolymer resins, in combination with "spherical close packed" dispersions of EPS beads or other non-conducting "spacer" particles, provide a high temperature material which is electromagnetically equivalent to low temperature "reticulated foam" microwave absorbers. Fundamentally, these types of chemical modifications are possible due to the large fraction of water contained in either the Step 1 suspension or the Step 2 solution of Example 1.

EXAMPLE 6

Dispersed Phase Raw Materials

This example identifies an extensive collection of raw materials which are chemically compatible with the geopolymer resins of Example 1 and, therefore, qualify as acceptable candidates for dispersed phase components of advanced geopolymer composites. These raw materials, by category, include: waste materials —flyash, sludges, slags, confetti, rice husks, bagasse, saw dust, etc; volcanic aggregates —expanded perlite, pumice, scoria, and obsidian; mineral forms —expanded mica (vermiculite), borosilicates, clays, metal oxides, etc.; plant and animal remains —distomaceous earth, sea shells, coral, excreta, hemp fibers, etc.; and manufactured fillers —silica microspheres, mineral fibers and mats, chopped/woven fiberglass, metal wools, turnings, or shavings, and synthetic microspheres, fibers, or mats. Advanced geopolymer composites fabricated from these raw materials typically exhibit the following characteristics: low combustibility; high melting points (similar to ceramics and refractories); low thermal and electrical conductivity; high acoustic absorptivity; low toxicity; low solubility in water; moderate acid/base resistance; mildew-, rot-, and vermin-proof; and insensitivity to infrared, ultraviolet, neutron, and charged particle radiation.

EXAMPLE 7

Manufacturing Processes

This example illustrates the adaptability of geopolymer resins and associated raw material additives to a variety of processes in the manufacture of advanced geopolymer composites. In general, high temperature performance specifications for final cured products will dictate uncured densities, viscosities, etc. These parameters, in turn, define the following manufacturing process classifications: wetted powders/fibers—compression molding with platen presses, rollers, etc.; pastas —sculpture, injection, or compression; and liquid slurries —pour-cast or spray-on. Therefore, depending on required production rates, potential manufacturing scenarios for advanced geopolymer composites span the full range from single unit hand-mixing and pour-casting by unskilled labor to fully automated production lines with continuous mixers, belts, etc,

What is claimed:

1. A self-hardened, high temperature-resistant, foamed composite comprising (1) an alkali metal silicate-based matrix devoid of chemical water having dispersed therein, (2) inorganic particulates, organic particulates, or mixed inorganic and organic particulates, produced at ambient temperature by activating the silicates of an aqueous, air-entrained gel containing matrix-forming silicate, particulates, flyash, surfactant, and a pH-lowering and buffering agent.

2. The foamed composite as described in claim 1, wherein said organic particulates include expanded polystyrene beads.

3. The foamed composite as described in claim 1, wherein said matrix-forming silicate is selected from the group consisting of sodium silicate, potassium silicate, and lithium silicate.

4. The foamed composite as described in claim 1, further comprising a strengthening agent.

5. The foamed composite as described in claim 1, wherein said strengthening agent includes wollastonite.

6. The foamed composite as described in claim 1, wherein said surfactant includes anionic surfactants.

7. The foamed composite as described in claim 6, wherein said anionic surfactant has hydrophylic and hydrophobic segments.

8. The foamed composite as described in claim 6, wherein said anionic surfactant includes sodium laurel sulfate.

9. The foamed composite as described in claim 1, wherein said silicates of said aqueous, air-entrained gel are activated using sodium fluorosilicate.

10. The foamed composite as described in claim 1, further comprising the wollastonite form of calcium metasilicate.

11. The foamed composite as described in claim 1, wherein said inorganic particulates, organic particulates, or mixed inorganic and organic particulates are present in amounts between 30 and 40 volume percent.

12. The foamed composite as described in claim 1, wherein said inorganic particulates, organic particulates, or mixed inorganic and organic particulates are selected from the group consisting of expanded polystyrene beads and polyethylene terephthalate polyester chopped fibers.

13. The foamed composite as described in claim 1, further comprising added water.

14. The foamed composite as described in claim 13, wherein said added water is present in about 15 volume percent.

15. The foamed composite as described in claim 1, wherein said pH-lowering and buffering agent includes at least one alkaline earth metal chloride.

16. The foamed composite as described in claim 15, wherein said alkaline earth metal chloride is selected from the group consisting of calcium chloride and magnesium chloride.

* * * * *